Figure 1:
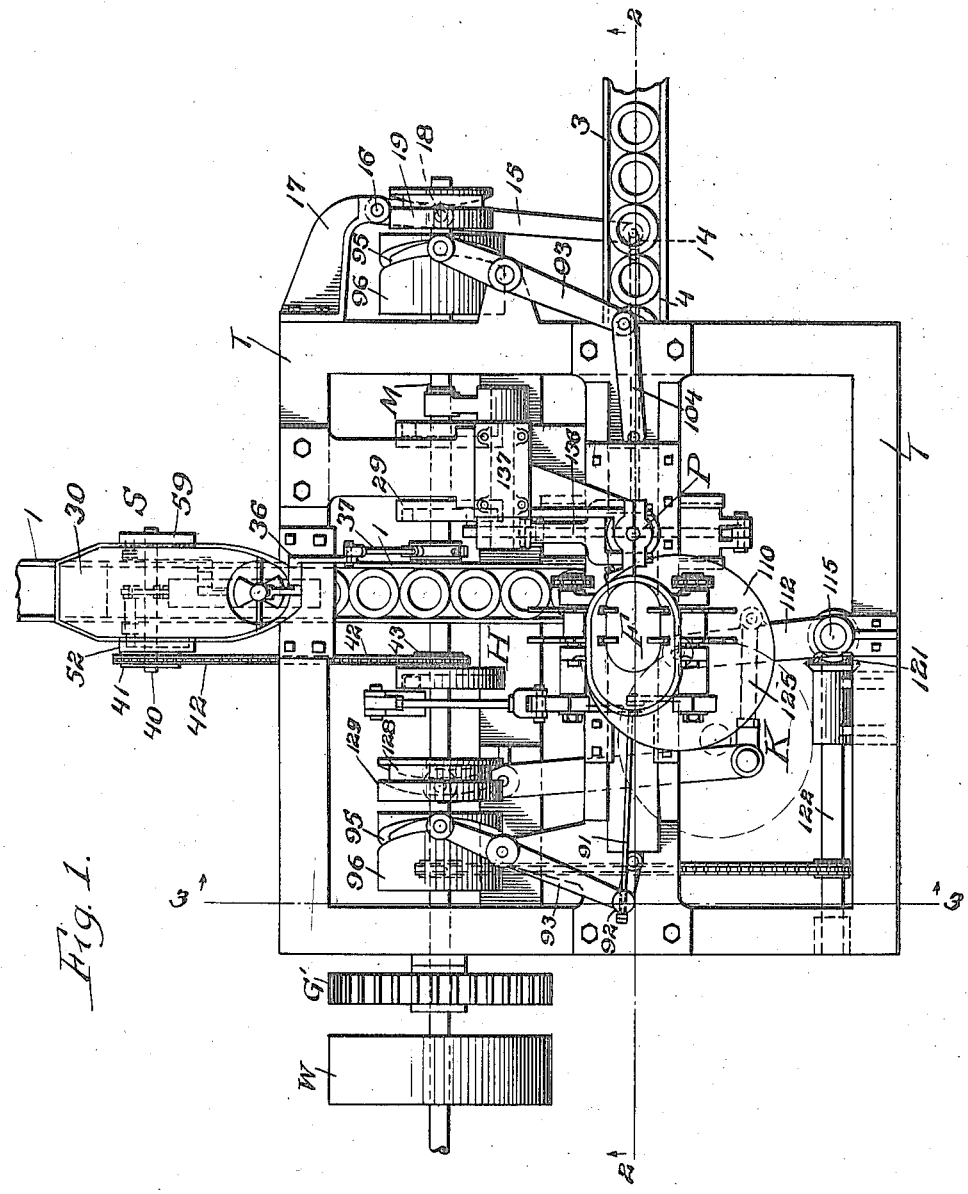

T. GOWEN.
FISH CANNING MACHINE.
APPLICATION FILED AUG. 7, 1914.

1,157,527.

Patented Oct. 19, 1915.
5 SHEETS—SHEET 1.

Witnesses
R. S. Trogner
N. L. Collamer

Inventor
Thomas Gowen
By Mason Fenwick & Lawrence
Attorneys

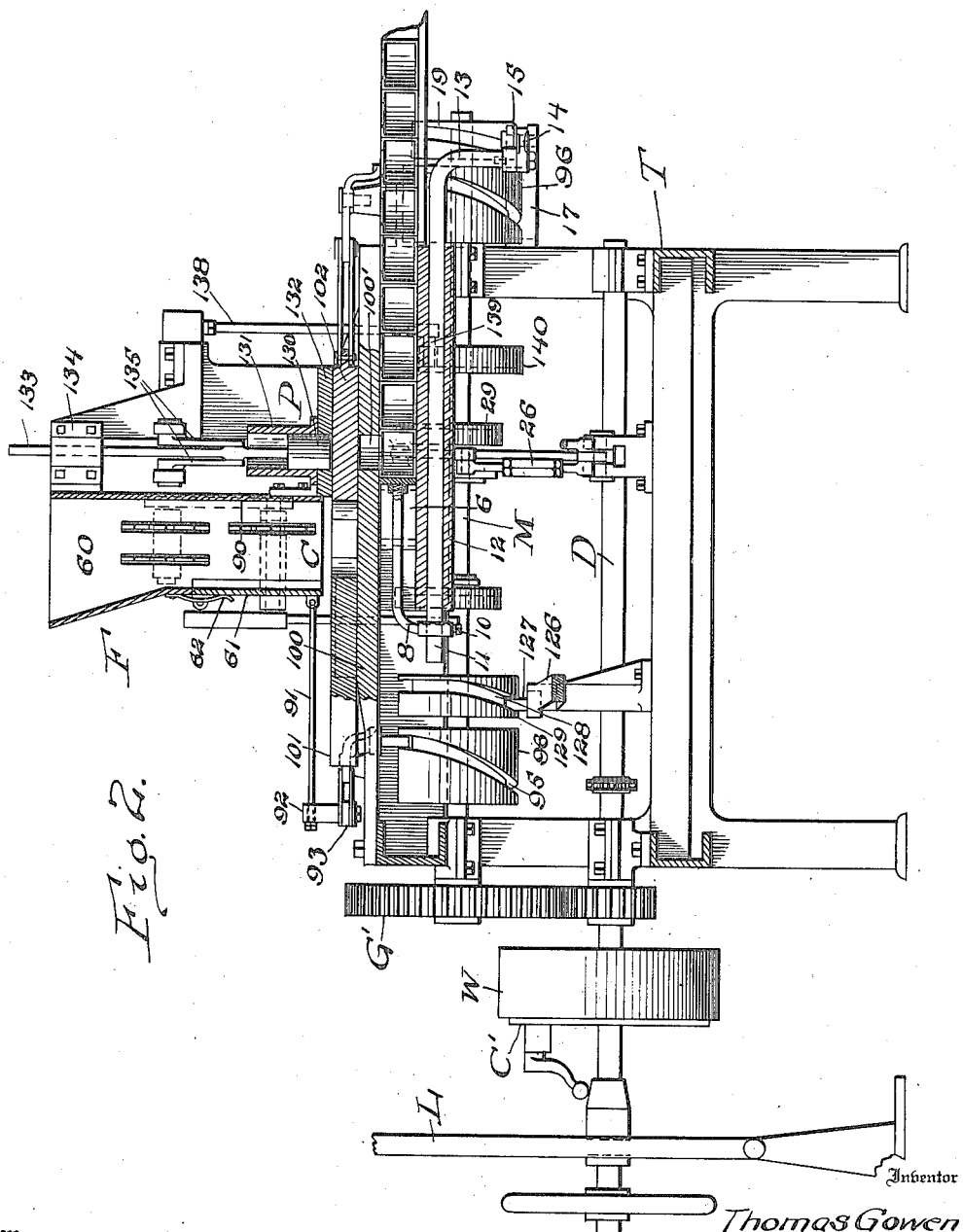

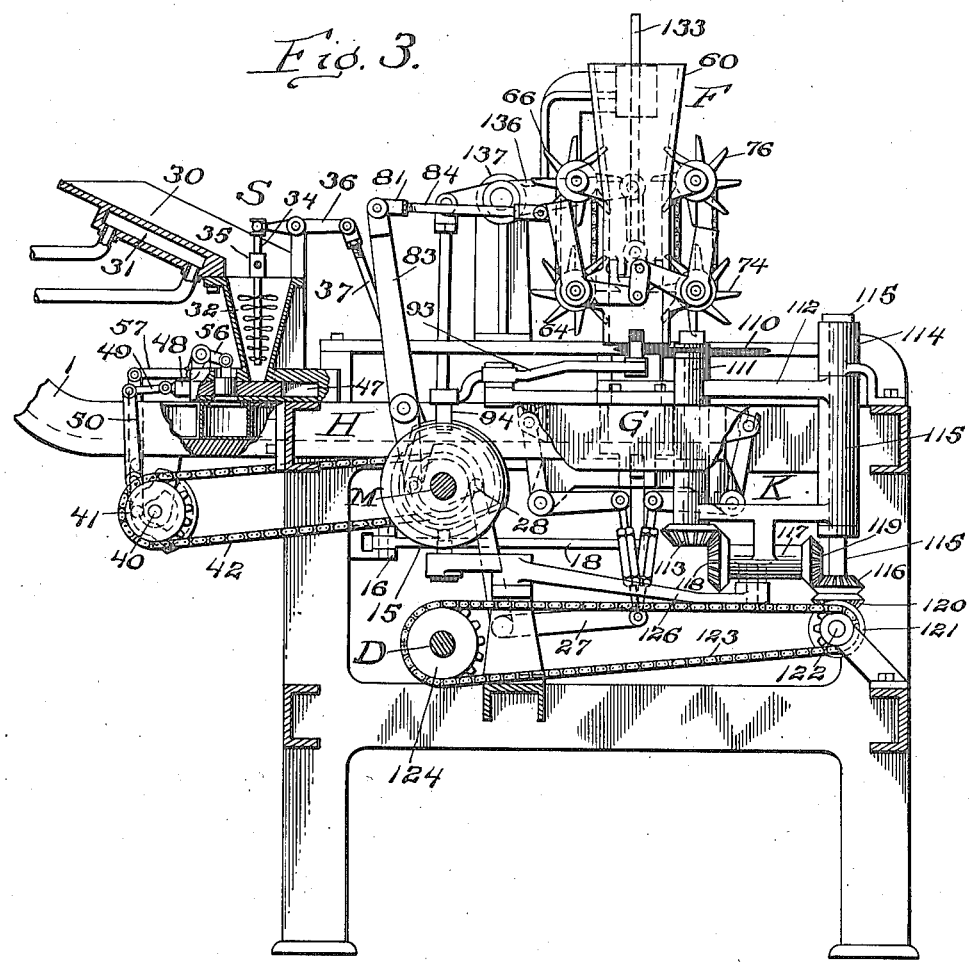
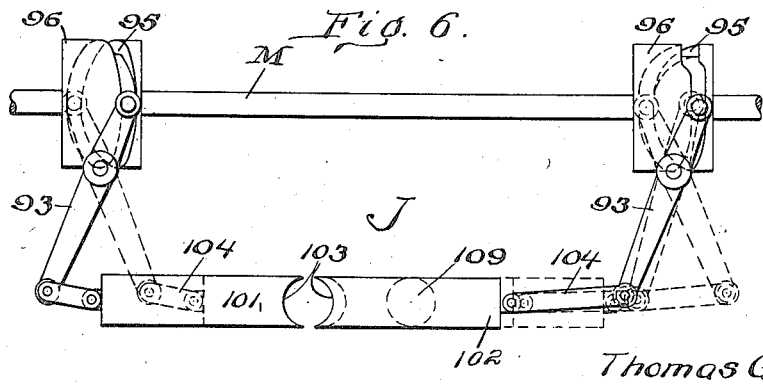

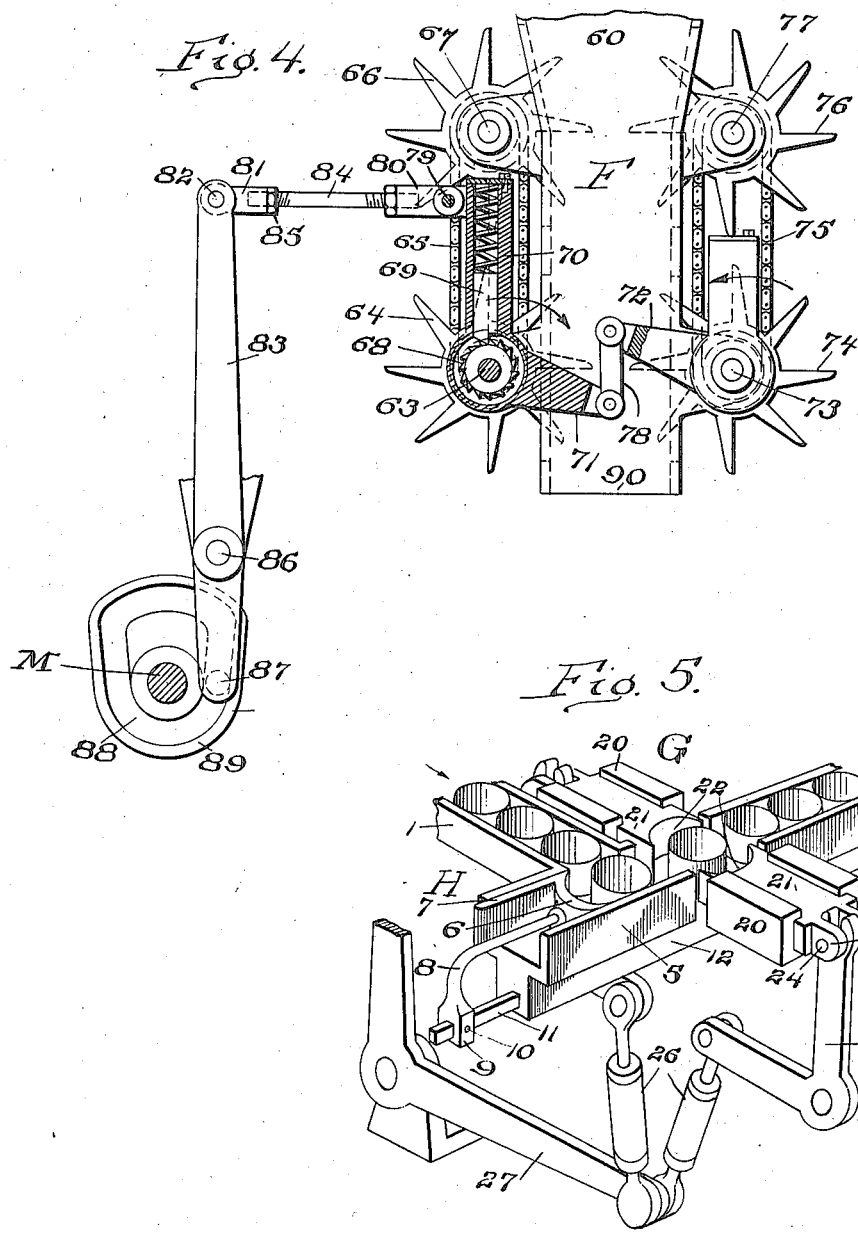

T. GOWEN.
FISH CANNING MACHINE.
APPLICATION FILED AUG. 7, 1914.

1,157,527.

Patented Oct. 19, 1915.
5 SHEETS—SHEET 5.

Inventor
Thomas Gowen

Witnesses

By

Attorneys

UNITED STATES PATENT OFFICE.

THOMAS GOWEN, OF SEATTLE, WASHINGTON.

FISH-CANNING MACHINE.

1,157,527.        Specification of Letters Patent.        Patented Oct. 19, 1915.

Application filed August 7, 1914. Serial No. 855,698.

*To all whom it may concern:*

Be it known, that I, THOMAS GOWEN, citizen of the United States, residing at Seattle, in the county of King and State of Washington, have invented certain new and useful Improvements in Fish-Canning Machines; and I do hereby declare the following to be a full, clear, and exact description of the invention, such as will enable others skilled in the art to which it appertains to make and use the same.

This invention relates to canning, and more especially to machines for canning fish; and the object of the same is to simplify the construction of such a machine and yet to provide it with the necessary mechanisms for handling the cans, placing a charge of salt in each, compressing the fish meat to the proper size of charge, and packing such charge in each salted can as the latter passes along toward its exit.

These several objects are carried out by the machine hereinafter more fully described and claimed, and as shown in the drawings wherein:—

Figure 7:
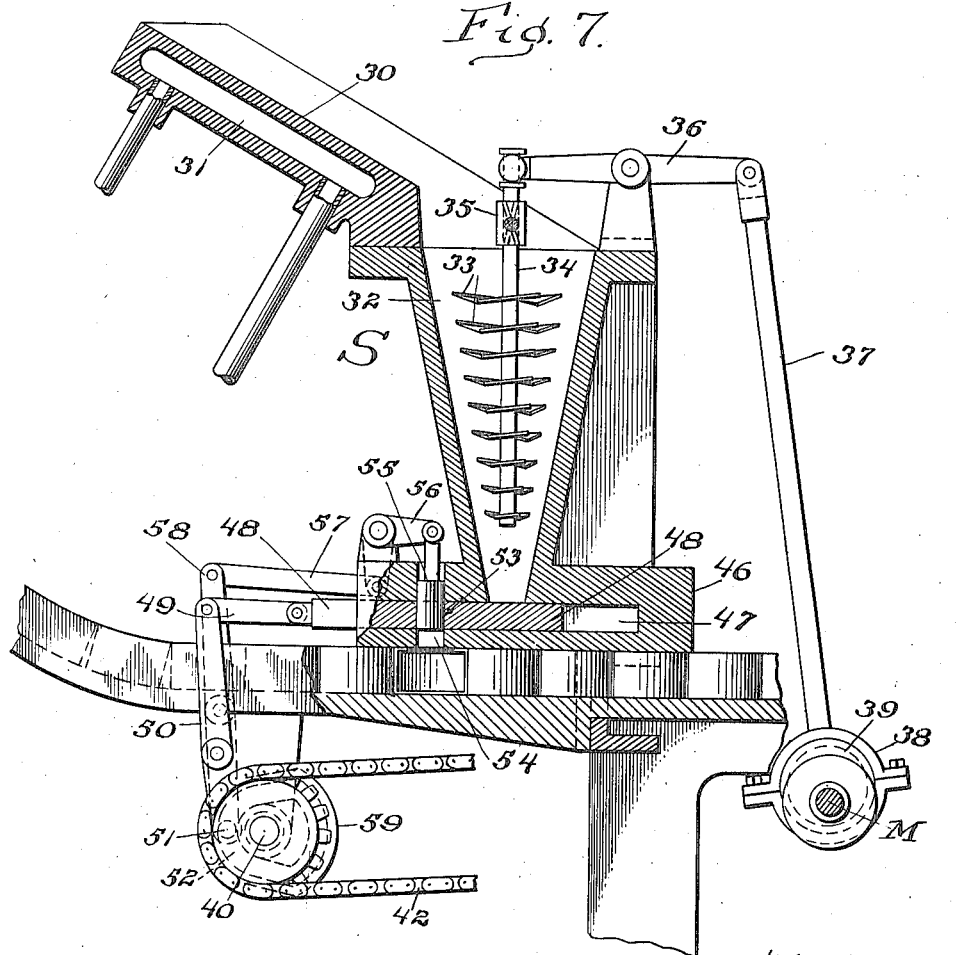
Figure 8:
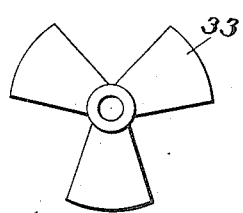
Figure 9:
Figure 10:
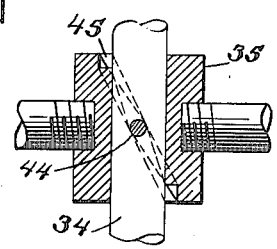

Figure 1 is a plan view of this machine entire, Fig. 2 is a section on the line 2—2 of Fig. 1, Fig. 3 is a vertical section on the line 3—3 of Fig. 1, Fig. 4 is an enlarged section through the feeding mechanism, Fig. 5 is an enlarged perspective detail of the can grip, Fig. 6 is a detail of the actuating mechanism for the compressing jaws, Fig. 7 is an enlarged sectional view of the salter, Fig. 8 is a plan view of one of the agitators, and Fig. 9 is an end view thereof. Fig. 10 is an enlarged sectional detail of the mechanism for turning the agitators.

The framework of this machine need not be described in detail. It is by preference of metal and of the general construction of a table T, and in it is journaled the power or drive shaft D driven from a power wheel W which is by preference connected with the shaft D by a clutch C' operated by a lever L. In the illustration given in Fig. 2 the power shaft D is connected by gears G' with the main shaft M, also journaled in the framework, and said shaft M carries the various cams and other devices for actuating the mechanisms yet to be described. No novelty is claimed for the driving mechanism or the framework. The coacting units of this canning machine are the can handler H including the can grip G, the salter S, the compressing mechanism C including the jaws J, the packing mechanism P, the feed mechanism F, and the cutting mechanism or knife K.

The can handling mechanism H, whose essential and important features are best seen in Fig. 5, includes a right-angular runway or track 1 whose inlet end may be inclined as seen at 2 in Fig. 3 so that the cans will enter the runway by gravity, although it is quite possible to feed the cans to the runway or track mechanically or manually if preferred. The runway passes next under the salting mechanism S yet to be described and leads forward through the frame work to about the center of the table top as seen in Fig. 1, here it makes a right angle and turns to the right where the cans pass between the jaws of the can grip as best seen in Fig. 5, and finally the filled cans are delivered at the point 3 in Fig. 1, ready to be capped and sealed and then labeled and packed. The shape and size of the runway will depend upon the cans employed, but they will be open-topped cans as illustrated, and preferably cylindrical as shown. The cans slip beneath the salter by the gravity or force of those supplied at the inlet, they are firmly held by the can grip while the charge of fish meat is being packed into them, and therefore the remaining feature of the can handling mechanism H with which we are concerned is the means for turning the cans at right angle in their course through the machine and taking one can at a time off of the first leg of the runway and starting it to the right along the second leg and into the grip. In Fig. 5 said second leg is numbered 4, and its inlet end 5 projects across the outlet end of the first leg 1 and is by preference made a little wider than its body 4 so as to accommodate a plunger 6. The face of the latter is curved to conform with the exterior of the can handled, and from one side a wing or guard projects to the rear to a sufficient distance to close the outlet end of the inlet leg 1 of the runway when the plunger is moving forward. Projecting to the rear from the plunger head is an arm 8 which turns downward and extends into an eye 9, the latter being adjustably held as by means of a set screw 10 on a bar 11 which leads through suitable guides 12 to the right of the machine as seen in Fig. 2. Here the bar 11 is turned down as seen as 13 and connected by means of a link 14 with a lever 15 (Fig. 1) whose remote end is pivoted at 16 to a bracket 17 carried by the frame T, and said lever carries a pin or roller 18 traveling in the groove of a cam 19 which is fast on the main shaft M. As the latter rotates the cam swings the lever 15 from side to side, and this movement through the link 14 reciprocates the bar 11. This moves the arm 8 and the plunger 6 in timed relation to the other mechanisms yet to be described, with the result that one can at a time is taken from the stack moving through the inlet leg 1 of the runway and pushed forward between the jaws of the grip yet to be described. As the plunger advances the guard 7 closes the outlet end of the inlet leg so that the stack cannot move, but as the plunger recedes this stack moves along for the distance of one can so that an entirely empty can comes under the salter in a manner yet to be described. When a fresh can is pushed between the jaws of the grip, the can that was there previously is impelled forward with the result that the stack in the outlet or second leg 4 of the runway is caused to move along one step, and a filled can is dropped or ejected at the point 3. Thus the cans are handled automatically from the time they are admitted at the point 2 to the time they are ejected in filled condition at the point 3.

The can grip G, while a part of the packing mechanism P, is also a part of the can handling mechanism H, and may be described in this connection, reference being had more especially to Fig. 5. Slidably mounted in guides 20 at opposite sides of the leg 4 near the inlet end 5 of the latter is a pair of jaws 21 whose faces 22 are curved to conform with the curvature of the can as shown. At the outer ends of these jaws are knuckles 23 to which are pivoted at 24 the upper arms of bell-crank levers 25. The lower arms of said levers are connected by links 26 with one arm of a power lever 27, also preferably of the bell-crank type, and the other arm of the power lever has a pin or roller 28 working in the groove of a cam 29 on the main shaft M. This groove is shaped and timed so that, just before the plunger of the packing mechanism P descends, the power lever is actuated to draw downward on the links 26 and move the levers 25 so that the jaws 21 are forced inward and their faces 22 grip a can within the second leg 4 of the runway and hold it while the charge of fish meat is packed into it. The arrangement of parts is such that the gripping mechanism releases this can after it has been filled and before the plunger 6 is actuated to push another and empty can forward against the filled can and to push the latter can forward into the leg 4 and along toward its exit 3. Having done so and left the empty can between the jaws 21, the plunger 6 is retracted and another empty can comes down the first leg of the runway from the salter in a manner already described.

The salter S which forms an important part of my machine for canning fish, is shown in its relative location in Figs. 1 and 3 and in enlarged section in Fig. 7, and is by preference constructed as follows: The numeral 30 designates a feed table beneath which is a steam space or jacket 31 and pipes for the supply of superheated steam and the exhaust of cool steam or condensation so that the surface of the table is kept hot. Over this surface is fed the salt which drops from the lower edge of the table into a hopper 32 wherein is mounted an agitator or pounder for stirring the salt or breaking it up if it be in lumps. This agitator is by preference composed of a number of blades 33 (see Figs. 8 and 9) strung on an upright shaft 34 which rises through a guide 35 at the top of the hopper and is reciprocated vertically and periodically by means of a walking beam 36. The latter is connected by a rod 37 with an eccentric band 38 which surrounds an eccentric 39 on the main shaft M. Preferably I employ a salter shaft 40 driven by a sprocket 41 and chain 42 from another sprocket 43 on the main shaft M, and this arrangement permits the entire salter to be disposed to the rear of the main framework T as best seen in Fig. 1 and yet causes it to act in timed relation with the other mechanisms herein described. The gang of blades 33 increases in size toward the top of the hopper as seen in Fig. 7, and the shaft 34 by preference carries a pin 44 which engages a groove 45 in the guide 35 so that at each vertical reciprocation of the shaft the same is turned to a considerable extent depending upon the shape of the groove 45. Thus the pounding action of these blades is augmented by a partial rotary action thereof so that the salt is both crushed and stirred; and, as it has been heated and dried out on the steam table 30, it is delivered at the lower end of the hopper in a finely divided condition. Said hopper has an enlarged base 46 cored out to form a transverse guide or guideway 47 which communicates with the outlet end of the hopper, and within this guide moves a gate 48 connected by a link 49 with a lever 50 which is pivoted between its ends, while its lower end carries a pin or roller 51 which engages a groove in a cam 52 mounted fast on the shaft 40. Said gate 48 has through it a hole 53 adapted when the gate is pressed inward to stand beneath the mouth of the hopper, and when the gate is drawn outward the hole is adapted to register with another hole 54 which is formed entirely through the base 46 and out of line with and in advance of the axial line of the hopper but immediately above the inlet leg of the runway above described. Within the hole 54 reciprocates a plunger 55 whose stem is connected with a bell-crank lever 56, the latter in turn being connected by a link 57 with a lever 58 which has a pin or roller like that on the lever 50 engaging a second cam 59 mounted fast on the shaft 40. The rotation of the latter in timed relation with the main shaft M therefore causes the rotation of these two cams, and these through their respective levers and links cause the reciprocation of the gate 48 within the guide 47 and the vertical reciprocation of the plunger 55 within the hole 54. When the gate is projected so that its hole 53 stands under the hopper, a charge of salt drops into said hole. When the gate is retracted its hole 53 registers with the hole 54. Just at this time the plunger 55 descends and the charge of salt is forced downward out of the hole 53 and through the hole 54 into the can beneath. On a reversal of this operation the plunger rises first and then the gate is projected forward beneath the outlet end of the hopper to receive a fresh charge. The thickness of the gate and the size of the hole 53 therein will determine the size of the charge of salt which is to be fed. After so charging the can with salt, the can handling mechanism H is actuated by its cam in the manner above described, and a can is pushed off the outlet end of the inlet leg 1 of the runway so that all the cans move forward for one step and an empty can comes under the plunger to be charged. I repeat at this point that the cans may be fed to the salter manually or in any other way, although in Fig. 3 I have illustrated an incline 2 down which they slide with sufficient force to push forward the next can in the inlet leg automatically.

The fish feeding mechanism F is shown in connected relation with other parts in Figs. 1, 2 and 3, and is illustrated in enlarged section in Fig. 4; and its construction is as follows: Rigidly supported at a suitable distance above the table is a hopper 60 having one side 61 hinged and spring-pressed as at 62 and its front and rear walls slotted for the reception of the teeth or spurs of a number of spur wheels as shown. Loosely mounted on a shaft 63 which is fixedly carried by and at the rear of the hopper is the main spur wheel 64 whose hub has a sprocket wheel connected by a chain belt 65 with the hub of another rear spur wheel 66 which rotates on a second and higher shaft 67, and the sprocket connection between these two spur wheels causes them to rotate in unison. A similar shaft 73 across the front of the hopper carries a lower spur wheel 74 whose hub is belted at 75 to the hub of an upper front spur wheel 76 mounted on a shaft 77, so that these two spur wheels revolve in unison.

Certain of these spur wheels may be double as best indicated in Fig. 2, and I do not wish to confine myself to one at each point described. The main spur wheel 64 has a ratchet 68 on its hub which is engaged by a spring-pressed pawl 69 mounted for vertical movement in the hollow upright arm 70 of a bell-crank lever which is loosely mounted at its angle around said shaft 63, and the other arm 71 of this lever passes alongside the hopper 60 and is connected by a link 78 with the lower arm 72 of a similar bell-crank lever having a pawl-and-ratchet mechanism (not shown in Fig. 4) and by means of which the spur wheel 74 is rotated in the direction of the arrow; and this mechanism causes the two lower spur wheels to rotate as shown, while the chains or belts 65 and 75 cause the two upper spur wheels to rotate simultaneously. The upright arm 70 of the first-mentioned bell-crank lever is connected at 79 with a three-part link, whereof the inner member 80 and the outer member 81 are alike, the member 81 being pivoted at 82 to a lever 83, and the third member is a rod 84 having right and left threads at its extremities engaging the members 80 and 81, with lock nuts 85 for holding it in such engagement. By this detail of construction the parts of this three-part link may be adjusted so as to adjust the path of movement through which the pawl 69 travels as it is thrown to and fro by the movement of the bell-crank lever 70—71. The lever 83 is pivoted as at 86 to a fixed support and carries at its lower end a pin or roller 87 moving in a groove 88 in a cam 89 which is fast on the main shaft M. At each rotation of the latter the lever 83 and link connections between it and the bell-crank lever 70—71, cause the latter to rock so that the pawl-and-ratchet mechanism 69—68 turns the main spur wheel 64, and this, through the connections above described, causes a simultaneous turning of all the other spur wheels. By this means fish fed into the hopper 60 is forced downward through it and past the hinged side 61 which is best shown in Fig. 2, and a fish of considerable size will thereby be handled by the feeding mechanism.

Compressing mechanism C is necessary at this point because, although the body of the hopper 60 converges downward to its lower end or spout 90 and both are oval as best seen in Fig. 1, the forced feed of a large fish downward by the mechanism just described will not ordinarily close up all interstices and certainly will not compact the mass sufficiently to permit it to be packed into a can. One element of the compressing mechanism is the hinged side 61 of the hopper spout described above and best illustrated in Fig. 2, and the other element thereof is the coacting compressor jaws J shown also in this view and in Fig. 6. Connected with the lower and swinging end of said hinged side 61 is a rod 91 leading to the left to a post 92 which rises from the front arm of a lever 93 (see Fig. 2) whose rear arm carries a pin or roller 94 moving in a groove 95 of a cam 96 mounted on the main shaft M. At each rotation of the latter the lever and rod 91 cause the hinged side 61 of the hopper spout to move inward and thus compress the charge being fed downward through it, whereby the dimension of this charge through the longest diameter of the oval spout is reduced. Directly beneath the lower and outlet end of said spout and slidably mounted in suitable guides on the head bar 100 of the machine is a pair of jaws 101 and 102 having their active faces 103 curved as shown in Fig. 6, and the outer end of each jaw is connected by a link 104 with one of the levers 93 above referred to. The shape of the cam-grooves in the two cams 96 is such that at intervals the jaws are drawn far apart so that the mass of fish which is in the hopper spout can be ejected from it by the spur wheels, next the cam-grooves cause the jaws to approach each other and compress said mass in addition to the compression produced by the movement of the side 61 as heretofore described, next said jaws are caused to move to the right in unison so that the compressed charge is carried to the point indicated by the dotted circle 109 in this view, at this time a plunger descends and packs the charge into a can beneath as described below, and finally the jaws resume their initial position and the operation is repeated. Thus it will be seen that the fish pressed downward by the spur wheels through the hopper mouth is compressed by the movement of the hopper side 61 and by the coaction of the jaws 101 and 102, and by the latter it is carried to a point where it is to be fed into the can.

A cutting mechanism K is necessarily provided between the outlet end of the hopper mouth 90 and the upper side of the jaws 101 and 102, above described, and the construction of this cutting mechanism is by preference as follows: A disk-shaped knife 110 is mounted on an upright shaft 111 in the inner arm of a rectangular frame 112, and said shaft carries a bevel gear 113 at its lower end. Journaled in the outer arm of said frame and in supporting bearings 114 is another upright shaft 115 having a bevel gear 116 near its lower end. Mounted in bearings 117 on the lower arm of the frame is a counter shaft having at one extremity a bevel gear 118 meshing with the gear 113, and at the other extremity a bevel gear 119 meshing with the gear 116, whereby rotation of the latter is imparted to the shaft 111 and the knife 110, no matter what the position of the frame. While any suitable means may be provided for rotating the shaft 115 from the power or main shaft, I prefer to provide said shaft 115 with a bevel gear 120 meshing with another bevel gear 121 on a counter shaft 122 journaled in bearings across the front of the table T as seen in Fig. 1; and this shaft may be connected with the main shaft M or by a sprocket and belt 123 with a sprocket 124 on the power shaft P as seen in Fig. 3. As this shaft is geared to the shaft M and rotates in timed relation therewith, the movement of the knife will not be interrupted, and at any rate the connection imparts only rotary movement to the knife 110 which, if made of disk form as shown, may rotate as rapidly as desired. Normally the knife stands out of the path of the fish being ejected from the hopper spout 90 as seen by dotted lines in Fig. 1, but for moving it across the outlet end of said spout and cutting the fish that has been pushed from said spout onto said bar 100 between the faces of the jaws 101 and 102, mechanism is provided for swinging the entire frame 112, and this mechanism is by preference as follows: A link 125 is connected with the frame 112 at one end, and at its other end with a lever 126, and the remote arm of said lever carries a pin or roller 127 moving in a groove 128 of a cam 129 mounted on the main shaft M. At each rotation of the latter this cam groove swings the lever 126 which, through the link 125, swings the frame 112 and moves the knife from the dotted position of Fig. 1 to the full-lined position therein. This causes the rotating knife to pass across the lower or outlet end of the hopper mouth 90 and between it and the upper sides or faces of the jaws 101 and 102 which are purposely spaced a short distance below said mouth so that the knife may pass between them as seen in Fig. 2; and the result is that the mass of fish already compressed by the movement of the side 61 and being pushed downwardly by the movement of the spur wheels, is cut off or severed, so that such portion of the mass as is below the knife becomes a charge lying between the jaws and subject to their compression and transfer to the packing mechanism, irrespective of that portion of the mass immediately above the knife. The latter retains the last-named portion of the mass within the hopper mouth until the jaws have carried the compressed charge to the packing mechanism and delivered it, and returned for the reception of another charge from the hopper spout.

The packing mechanism P for forcing the compressed charge of fish into a can is best seen in Fig. 2. In this view the number 130 designates a plunger mounted in upright guides 131 rising from a base plate 132 which immediately overlies the path of the jaws 101 and 102, and the stem 133 of said plunger rises through guides 134 of its own and is connected by a link or links 135 with a walking beam 136 which is seen in side elevation in Fig. 3 and in plan view in Fig. 1. This walking beam has two arms and between them a rock shaft mounted in a suitable bearing 137, and the rear or outer arm carries a pendent rod 138 (see Fig. 2) having a pin 139 at its lower end which moves in the groove of a cam 140 mounted on the main shaft M. At each rotation of the latter the walking beam moves so that its inner arm causes the rise and fall of the plunger 130 in timed relation with the other parts of the machine, and thus as the jaws 101 and 102 carry the compressed charge to the point 109 shown in Fig. 6, the plunger descends and forces said charge through a hole 100' in the head bar 100 as seen in Fig. 1, and into the can immediately beneath. This can at that moment is held by the can grips illustrated in Fig. 5 and described above, and therefore the can is braced vertically and laterally to resist the pressure set up by the forcible ejection of the charge from between the jaws, through the hole in the head bar, and into the can. In other words, whereas the fish that went into the hopper were in loose pieces, the spur wheels cut up the pieces and sent them downward in a mass as yet not compressed, the compressing mechanism reduced the volume of that mass and the action of the jaws compressed it considerably, the knife severed it from what remained in the hopper spout, the jaws then carried it along to a point beneath the plunger, and the forcible descent of the latter ejected it from between the jaws and compressed the charge vertically within the can; and in its final condition the charge within the can will be under considerable pressure or compression in all directions. Further rotation of the main shaft M causes the connecting mechanism to raise the plunger, when the can is caused to move forward and be replaced by an empty can, and as soon as the plunger has passed out from between the jaws 101 and 102, the latter may return to a point beneath the hopper and open to receive another charge; and thereafter the action of this machine is repeated.

Thus it will be seen that this fish canning machine comprises the following instrumentalities working in conjunction and in timed relation with each other, and it is complete within itself so that it needs only that the fish be fed into the hopper, the salt onto the drying table, the cans into the runway, and the filled cans taken from the outlet end of the machine. A can handling mechanism whereby the cans may pass step by step beneath the salter or salting mechanism along the inlet leg of the runway, then turn at right angles and are gripped while they are being packed, and sent along the outlet leg of the runway to the can exit; a salting mechanism whereby a charge is placed in each can as it passes beneath the salt hopper; a fish feeding mechanism whereby whole fish or considerable parts thereof when fed into the hopper are disintegrated and forced downward to and through the hopper spout; a compressing mechanism whereby the particles of fish within said spout are compressed and the charge of fish after it has been ejected from the spout is further compressed; a cutting mechanism for severing the charge of fish from the compressed portion thereof which remains in the spout; and a packing mechanism for pushing the compressed charge of fish out of the jaw compressors and into a can while the latter is held between the grips of the can handling mechanism above mentioned. I have not thought it necessary to elaborate the details excepting, perhaps, with respect to the adjustment possible in the tree-part link composed of the members 80, 81 and 84; but it is obvious that adjustments could be made at various points as, for instance, with the links 26 shown in Fig. 5, and elsewhere. It is also possible to make considerable change in or elaboration of the details without departing from the spirit of this invention, and I wish it to be understood that I have described only one means for successfully carrying out the general idea.

What is claimed as new is:

1. In a canning machine, the combination with the salting mechanism, and the compressing and packing mechanisms; of a can handler including an angular track one leg of which passes under said salting mechanism and the other leg under the remaining mechanisms, a plunger in the second leg of the track moving across the outlet end of the inlet leg of said track for taking one can at a time from said inlet leg and starting it along the outlet leg, a guard on the plunger closing the outlet end of the inlet leg when the plunger is projected, can gripping mechanism consisting of two jaws projecting through the walls of the second leg of said track, and means for actuating said jaws in timed relation to said plunger to hold a can temporarily beneath the packing mechanism.

2. In a canning machine, the combination with the salting mechanism including a plunger, and the fish-feeding, compressing, and packing mechanisms, the latter including a plunger; of a can handler including a right-angular track one leg of which passes under the plunger of said salting mechanism and the other leg under the remaining mechanisms, a plunger for taking one can at a time from the inlet leg of said track and starting it along the outlet leg, a guard closing the outlet end of the inlet leg when the can plunger is projected, and can gripping mechanism for holding one can at a time beneath the plunger of the packing mechanism.

3. In a canning machine, the combination with mechanism for feeding the fish downward, a head bar disposed beneath the same and having a hole out of alinement with the fish feed, and the can handling mechanism for moving a stack of cans under said bar and holding them one at a time beneath said hole; of the packing mechanism including a base standing above said head bar and a tubular guide mounted thereupon in line with said hole, a plunger movable in said guide for ejecting a charge of fish through said hole and into a can beneath, a pair of jaws slidably mounted on said head bar and beneath said base and feeding mechanism, and driving mechanism operating in timed relation with said plunger for bringing the jaws together to compress a charge ejected from the feeding mechanism, then moving the jaws in unison to a point where the compressed charge stands beneath said plunger, and, after the latter descends, returning said jaws to their initial position and opening them for the reception of another charge from the feeding mechanism.

4. In a canning machine, the combination with the feeding mechanism including a hopper and means for forcing the fish down through the same, the compressing mechanism including a pair of jaws operating beneath the hopper-spout to compress a charge and then carry it out of alinement with the spout, and means for actuating the jaws; of the packing mechanism including a plunger and means for actuating it to eject the compresed charge from said jaws, and the can-handling mechanism for disposing an empty can beneath the packing mechanism and removing a filled can.

5. In a canning machine, the combination with the feeding mechanism including a hopper and means for forcing the fish down through the same, one side of the hopper being hinged, the compressing mechanism including a pair of jaws operating beneath the hopper-spout to compress a charge delivered by said spout and then carry such charge out of alinement with the spout, means for actuating the jaws, and means for swinging the hinged side of the hopper inward in timed relation with the compressing action of said jaws; of the packing mechanism including a plunger and means for actuating it to eject the compressed charge from said jaws, and the can-handling mechanism for disposing an empty can beneath the packing mechanism and removing a filled can.

6. In a canning machine, the combination with a hopper and means for forcing the fish down through the same, one side of the hopper being hinged, a pair of jaws operating beneath the hopper-spout to compress a charge delivered by said spout and then carry such charge out of alinement with the spout, and means for swinging the hinged side of the hopper inward in timed relation with the compressing action of said jaws; of a head bar beneath said jaws and having a hole out of alinement with the hopper-spout, means for ejecting said compressed charge of fish from between the jaws and through the hole in the head bar, and means for placing an empty can beneath said hole and removing a filled can.

7. In a canning machine, the combination with the feeding mechanism including a hopper and means for forcing the fish down through the same, one side of the hopper being hinged, the compressing mechanism including a pair of jaws operating beneath the hopper-spout to compress a charge delivered by said spout and then carry such charge out of alinement with the spout, means for actuating the jaws, and means for swinging the hinged side of the hopper inward in timed relation with the compressing action of said jaws; of a head bar beneath said jaws and having a hole out of alinement with the hopper-spout, an upright tubular guide above said jaws and in line with said hole, a vertically movable plunger for ejecting said compressed charge of fish from between the jaws and through the hole in the head bar, and means for placing an empty can beneath said hole and removing a filled can.

8. In a fish canning machine, the combination with a head bar having a hole, the packing mechanism including a plunger reciprocating through said hole and a base spaced above said head bar, the can handling mechanism beneath said head bar, and a pair of compressing jaws movable over the head bar and beneath said base; of a feed hopper alongside the packing mechanism and with the lower end of its spout spaced above said jaws, and the cutting mechanism including a knife and means for swinging it periodically between the outlet end of said spout and the upper side of said jaws.

9. In a fish canning machine, the combination with a head bar having a hole, the packing mechanism including a plunger reciprocating through said hole and a guide and a base spaced above said head bar, the can handling mechanism beneath said head bar, and a pair of compressing jaws movable over the head bar and beneath said base; of a feed hopper alongside the packing mechanism and with the lower end of its spout spaced above said jaws, means in said hopper-spout for partially compressing the fish laterally, independent means for forcibly feeding it into the space between said jaws when they stand beneath the spout, and the cutting mechanism.

10. In a feed mechanism for the purpose set forth, the combination with a hopper having a hinged side section and a spout, means for forcibly moving the contents of the hopper and spout downward, and mechanism for swinging said hinged side to partially compress the charge passing through the hopper-spout; of moving jaws for further compressing the charge delivered by the spout and carrying it to a remote point, and mechanism for ejecting the compressed charge from said jaws into a can.

11. In a salting mechanism for the purpose set forth, the combination with an upright hopper; of a tubular guide standing above the hopper and having a pin projecting into its bore, an upright shaft mounted within said guide and having a spiral groove receiving the pin, means for reciprocating the shaft vertically at intervals, and a series of agitator blades mounted on the shaft within the hopper.

12. In a salting mechanism for the purpose set forth, the combination with an upright hopper, a feed table delivering to the upper end thereof, and means for periodically taking a charge from the mouth of the hopper and conveying it to a remote point; of a tubular guide standing above the hopper and having a pin projecting into its bore, an upright shaft mounted within said guide and having a spiral groove receiving the pin, means for reciprocating the shaft vertically at intervals, and a series of agitator blades mounted on the shaft within the hopper.

In testimony whereof I affix my signature in presence of two witnesses.

THOMAS GOWEN.

Witnesses:
G. WARD KEMP,
EDWARD JABLONSKI.